April 21, 1959     E. L. MILLER     2,883,230
HYDRAULIC GRAPPLE LOADER
Filed Jan. 10, 1955     2 Sheets-Sheet 1
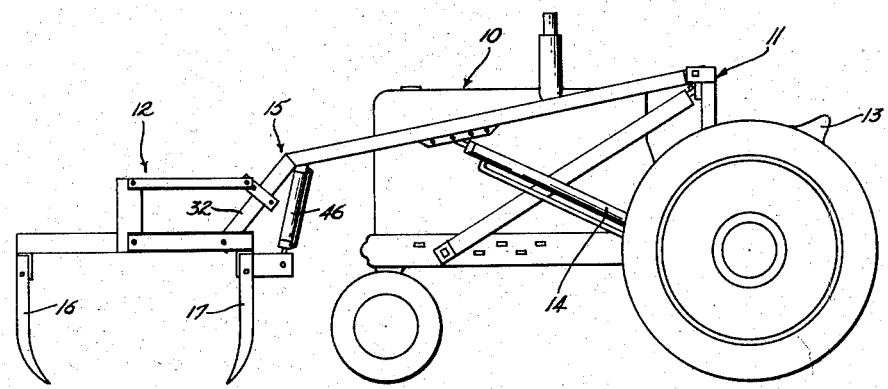
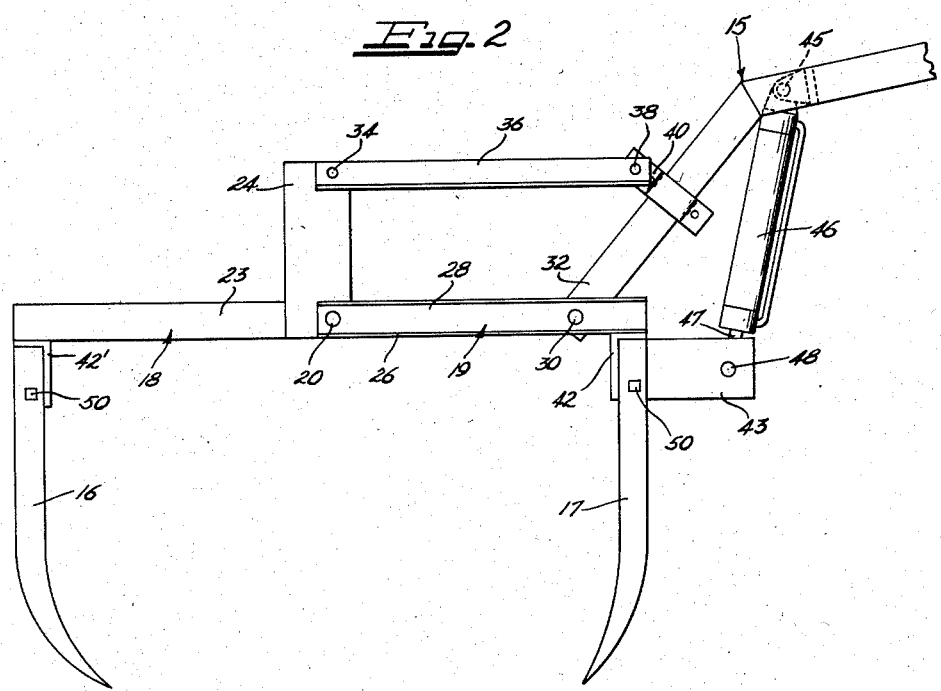
Inventor
ELMER L. MILLER April 21, 1959 E. L. MILLER 2,883,230
HYDRAULIC GRAPPLE LOADER
Filed Jan. 10, 1955 2 Sheets-Sheet 2
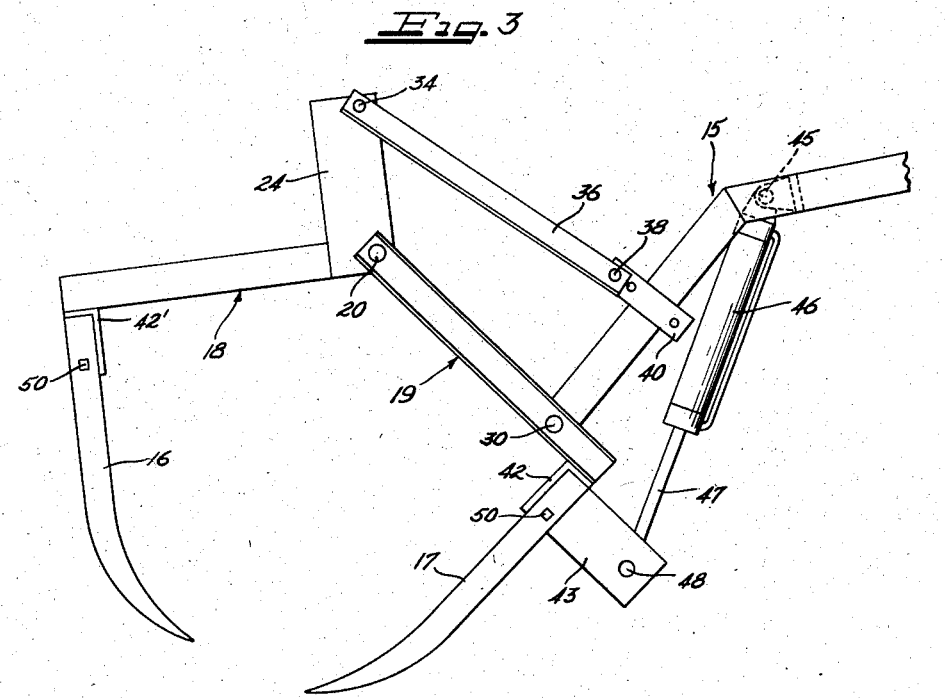
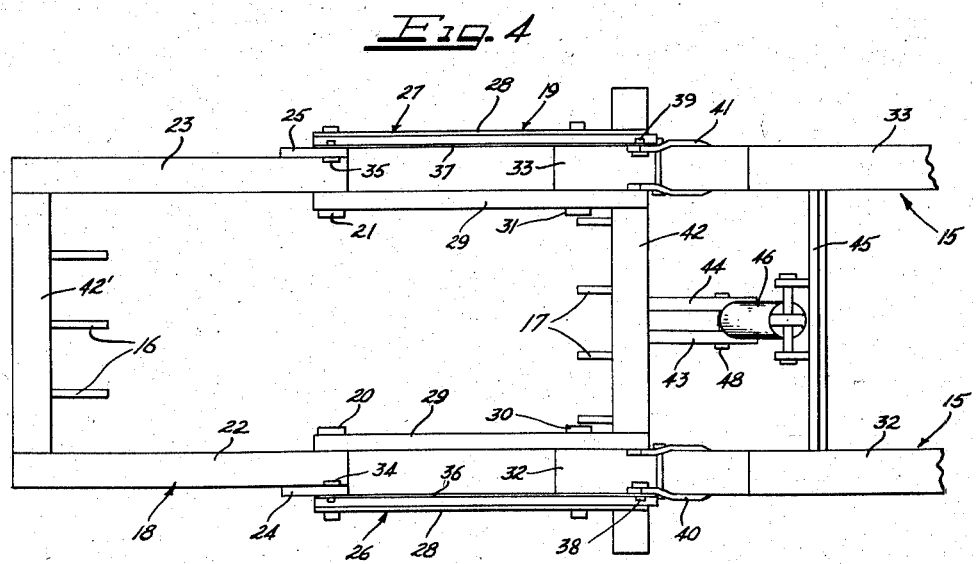
Inventor
ELMER L. MILLER

United States Patent Office 2,883,230
Patented Apr. 21, 1959

2,883,230

HYDRAULIC GRAPPLE LOADER

Elmer L. Miller, Sioux Falls, S. Dak.

Application January 10, 1955, Serial No. 480,950

7 Claims. (Cl. 294—88)

This invention relates to a grapple loader which may be mounted on a tractor or the like for facilitating innumerable barnyard operations.

An object of this invention is to provide an hydraulically powered grapple loader mountable on a frame which is attachable to a tractor.

Another object of this invention is to provide an improved grapple loader which for its size can carry a load of substantially maximum capacity and discharge such load at a maximum height.

Still another object of this invention is to provide an improved grapple loader which is very strong, rugged and durable and yet readily manufacturable from a minimum number of parts.

Another and further object of this invention is the provision of a grapple loader which is economical to manufacture, easy to mount on a tractor in operating position and efficient in operation.

In accordance with the general features of the present invention, there is provided in a grapple for a loader and the like for use with an arm for raising and lowering same, a pair of opposed members each with a set of spaced teeth at an angle thereto, the members being connected together at their junction, a pivotal connection for connecting one of the members to the arm, linkage at said junction between the other member and said arm, and hydraulic means adapted for pivotal connection to the arm and also being pivotally connected to the one member and operable in one direction to move the one member toward the other and to operate the linkage to similarly move the other member and thereby to move the teeth together in a clam-shell action for closing upon material being grappled and loaded.

Other objects, features and advantages of the present invention will be readily apparent from the following detail description taken in connection with the accompanying drawings which illustrate a preferred embodiment and in which:

Figure 1 is a side elevational view, of a tractor having mounted thereon hydraulically operable means connected to my novel hydraulically operable grapple loader;

Figure 2 is a fragmentary enlarged side elevational view of my novel grapple loader showing same in open position;

Figure 3 is a fragmentary enlarged side elevational view of my novel grapple loader similar to that shown in Figure 2 only illustrating same in a closed position; and Figure 4 is a fragmentary enlarged plan view of my novel grapple loader showing same in open position.

As shown on the drawings:

The reference numeral 10 (Figure 1) indicates generally a conventional tractor having mounted thereon suitable loader frame 11 for sustaining and moving my novel grapple or clam-shell type loader 12.

The lowering and elevating of my novel grapple loader is accomplished through any suitable hand operable hydraulic controls (not shown) mounted adjacent the driver seat 13 which activates the hydraulic cylinder and piston 14 to raise and lower the pivotally mounted frame comprising parallel arms 15 which in turn carries my novel grapple loader 12. For a more detail description of a lowering and elevating mechanism which may, for example, be adapted for use with my novel grapple loader 12, attention is directed to my co-pending application filed June 15, 1954, Serial No. 436,815, entitled "Tractor-Mounted Loader now Patent No. 2,820,558 dated January 21, 1958.

My novel grapple loader includes two sets of replaceable and substantially identical but opposed curved teeth 16 and 17 each set of which is rigidly secured to an open ended generally U-shaped member, indicated generally at 18—19, and which have their legs pivotally joined at their respective terminal ends at pivot points 20 and 21 (Figures 2 and 4). These U-shaped members 18—19 are each constituted of a series of arms and legs which shall now be described.

Rigidly secured to terminal ends of the respective arms or legs 22 and 23 of member 18 are upstanding links 24 and 25. Each of arms 26 and 27 of the U-shaped member 19 is comprised of two legs or links 28 and 29 which are pivotally connected as previously described at 20—21 with arms 22—23. The links or legs 28 and 29 are pivotally connected at 30—31 at their opposite terminal ends to the respective terminal arm ends 32 and 33 of the pivotally mounted frame arms 15.

Pivotally joined at 34 and 35 (Figures 2 and 4) to respective upstanding links 24 and 25 are links 36 and 37 of L-shaped cross section, which are in turn pivotally secured at 38 and 39 by means of clamps 40 and 41 to terminal ends 32 and 33 of the frame arms 15.

Cross arm or bight 42 of member 19, from which the teeth 17 project, has a pair of rigidly mounted ears 43 and 44 attached and extending outwardly therefrom. Also, it will be noted that the other set of teeth 16 are carried by a cross arm or bight 42' of frame member 18.

Mounted between intermediate portions of frame arm ends 32 and 33 is a cross bar 45 which in turn has pivotally suspended therefrom hydraulic cylinder 46. The cylinder 46 has an extendable piston 47 which is pivotally connected at 48 to and between ears 43 and 44.

Having now described the mechanical elements of my novel grapple loader, I will now proceed with a description of how the grappler operates to pick up fodder, or any other type of material which lends itself to being lifted by spaced teeth.

In operation, the grapple loader 12 is hydraulically lowered into material lifting position by parallel arms 15 in response to operation of the hand controls (not shown) adjacent the seat of the operator.

Thereafter, another control is manipulated (not shown) and the piston 47 of hydraulic cylinder 46 is thrust downwardly against the links 43 and 44 which in turn causes the various arms or links previously described to pivot at points 20, 21, 30, 31, 34, 35, 38, 39 and 48, respectively, causing the respective sets of teeth 16 and 17 to move together and close upon the material to be lifted (Figure 3).

The load thus grappled is then elevated by hydraulically lifting the loader 12 through the raising of the hydraulically actuated frame arms 15; and the elevated load can be thereafter discharged, into a truck or the like, by the retraction of the piston or plunger 47 in the hydraulic cylinder 46 which results in the separating of the sets of teeth 16—16 so that the load can gravitate downwardly therefrom.

The construction and arrangement of the curved prongs or the teeth 16—17 is such that the teeth can readily bury themselves in the material being grappled so as to engage a maximum load in each operation. As is evident in Figure 3, the teeth 17—17 are movable through a greater arc than the teeth 16 upon the actuation of the piston rod 47 to enable the teeth 17 to scoop under the load to be grappled which greatly facilitates unloading of forage crops directly out of a haystack or a hayrack.

In addition, the teeth are suitably bolted together as indicated at 50 on the cross arms 42—42' and are suitably spaced apart. Any suitable number of teeth may be employed and the space between them may be varied depending upon the character of the material being loaded. For example, material such as grass silage, chopped hay and sugar beets may require the use of differently spaced teeth depending upon the fineness of the material. In any event, it is contemplated that the pointed curved teeth shall readily bury themselves with minimum resistance in the material being grappled.

It will be appreciated that my present invention is primarily concerned with the construction and arrangement of the parts of the loader, including the hydraulic cylinder 46 and piston 47 for opening and closing the same and not particularly with the hydraulically operated arms 15 for raising and lowering the loader. In fact, any suitable hydraulically operated boom or arm, of which there are many available in the loader art, could be employed for raising and lowering the loader of my invention.

Another advantage of my construction is that the tooth arrangement on each side of the loader is substantially identical so that the teeth can be readily interchanged and replaced.

Still another advantage of my construction is that the teeth arrangement may be augmented by the attachment of curved plates to the respective sets of teeth so that my novel grapple loader could be adaptable to handle finer materials.

As far as I have been able to determine, there is no tooth loader available at the present time that can handle forage crops directly out of the hayrack or haystack with the facility and ease of operation of my loader.

It will be understood that modifications and variations may be effected without departing from the spirit and scope of the novel concepts of the present invention.

I claim as my invention:

1. In a grapple for a loader and the like for use with an arm for raising and lowering same, a pair of opposed members each with a set of spaced teeth at an angle thereto, said members being connected together at their junction, a pivotal connection for connecting one of said members to said arm, linkage at said junction between the other member and said arm, and hydraulic means adapted for pivotal connection to said arm and also being pivotally connected to said one member and operable in one direction to move said one member toward the other and to operate said linkage to similarly move the other member and thereby to move said teeth toward one another in a clam-shell action for closing upon material being grappled and loaded.

2. In a grapple for a loader and the like for use with an arm for raising and lowering same, a pair of opposed members each with a set of spaced teeth at an angle thereto, said members being connected together at their junction, a pivotal connection for connecting one of said members to said arm, linkage at said junction between the other member and said arm, and hydraulic means adapted for pivotal connection to said arm and also being pivotally connected to said one member and operable in one direction to move said one member toward the other and to operate said linkage to similarly move the other member and thereby to move said teeth toward one another in a clam-shell action for closing upon material being grappled and loaded, said hydraulic means being operable in an opposite direction to move said teeth apart and said members into general longitudinal alignment with said teeth at right angles thereto in the discharge position of the grapple.

3. In a grapple for a loader and the like for use with an arm for raising and lowering same, a pair of opposed members each with a set of spaced teeth at an angle thereto, said members being connected together at their junction, a pivotal connection for connecting one of said members to said arm, linkage at said junction between the other member and said arm, and hydraulic means adapted for pivotal connection to said arm and also being pivotally connected to said one member and operable in one direction to move said one member toward the other and to operate said linkage to similarly move the other member and thereby to move said teeth toward one another in a clam-shell action for closing upon material being grappled and loaded, said linkage comprising a pair of pivotal links at an angle to each other one being connected to one of said members adjacent said junction and the other having a pivotal connection for attachment to said arm.

4. In a grapple for a loader and the like for use with an arm for raising and lowering same, a pair of opposed members each with a set of spaced teeth at an angle thereto, said members being connected together at their junction, a pivotal connection for connecting one of said members to said arm, linkage at said junction between the other member and said arm, and hydraulic means adapted for pivotal connection to said arm and also being pivotally connected to said one member and operable in one direction to move said one member toward the other and to operate said linkage to similarly move the other member and thereby to move said teeth toward one another in a clam-shell action for closing upon material being grappled and loaded, said teeth being substantially identical and being spaced apart on said members, each of the teeth having a lower extremity curved toward the set of spaced teeth on the opposite side whereby the curved tips of the teeth will be moved toward one another when they are being moved by the hydraulic means into closed engagement with the material being loaded.

5. In a grapple for a loader and the like for use with an arm for raising and lowering same, a pair of opposed members each with a set of spaced teeth at an angle thereto, said members being connected together at their junction, a pivotal connection for connecting one of said members to said arm, linkage at said junction between the other member and said arm, and hydraulic means adapted for pivotal connection to said arm and also being pivotally connected to said one member and operable in one direction to move said one member toward the other and to operate said linkage to similarly move the other member and thereby to move said teeth toward one another in a clam-shell action for closing upon material being grappled and loaded, said hydraulic means being operable in an opposite direction to move said teeth apart and said members into general longitudinal alignment with said teeth at right angles thereto in the discharge position of the grapple, said teeth being substantially identical and being spaced apart on said members, each of the teeth having a lower extremity curved toward the set of spaced teeth on the opposite side whereby the curved tips of the teeth will come together when they are being moved by the hydraulic means into closed engagement with the material being loaded.

6. In a grapple for a loader and the like for use with an arm for raising and lowering same, a pair of opposed members each with a set of spaced teeth at an angle thereto, said members being connected together at their junction, a pivotal connection for connecting one of said members to said arm, linkage at said junction between the other member and said arm, and hydraulic means adapted for pivotal connection to said arm and also being pivotally connected to said one member and operable in one direction to move said one member toward the other and to operate said linkage to similarly move the other member and thereby to move said teeth toward one another in a clam-shell action for closing upon material being grappled and loaded, each of said members being generally of a U-shaped configuration with the extremities of the legs of the U pivotally attached to the extremities of the legs of the opposite U-shaped member, said hydraulic means being connected to the bight of said one member and the legs of said one member being provided with a pivotal connection for attachment to said arm, said linkage being connected to the extremities of the legs of the other member.

7. In a grapple type hay loader apparatus including a boom structure adapted to be pivotally mounted at one end on a vehicle in a manner to enable raising and lowering the boom structure, the improvements comprising the other end of the boom structure having mounted thereon a grapple type hay loader structure, said grapple structure including a pair of inner and outer radius members in generally longitudinally opposed relation with the radius members disposed longitudinally of the boom structure and with each of the radius members having depending fork structure at an angle thereto, said radius members being pivotally mounted relative to one another upon a common axis generally outwardly beyond the boom and swingable upon the axis thereby swinging the fork structures through arcs relative to one another, a pivotal connection spaced generally inwardly from said axis connecting said inner radius member to said boom, pivotal link means between said outer radius member and projecting forwardly from said boom, and actuator means connected to said boom structure and to said inner radius member and operable in one direction to swing said inner radius member and thereby said fork structures through their arcs with the inner member and its fork structure swingable through an arc toward said outer radius member and its fork structure to scoop under the load to be grappled while said link means concurrently controls movement of said outer radius member and its fork structure toward said inner fork structure.

References Cited in the file of this patent

UNITED STATES PATENTS

| | | |
|---|---|---|
| 1,773,478 | Dovel | Aug. 19, 1930 |
| 2,561,207 | Kellner | July 17, 1951 |
| 2,622,915 | Horn | Dec. 23, 1952 |
| 2,652,280 | Billings | Sept. 15, 1953 |
| 2,676,837 | Wagner et al. | Apr. 27, 1954 |

FOREIGN PATENTS

| | | |
|---|---|---|
| 648,608 | Great Britain | Jan. 10, 1951 |
| 709,219 | Great Britain | May 19, 1954 |